United States Patent [19]

Michel et al.

[11] Patent Number: 5,162,869
[45] Date of Patent: Nov. 10, 1992

[54] APPARATUS AND METHOD HAVING AT LEAST ONE WAVEGUIDE COUPLER TO CREATE AT LEAST TWO SIGNALS HAVING A MUTUAL PHASE SHIFT NOT EQUAL TO 180 DEGREES

[75] Inventors: Dieter Michel, Traunstein; Andreas Franz, Kienberg, both of Fed. Rep. of Germany

[73] Assignee: Johannes Heidenhain GmbH, Traunreut, Fed. Rep. of Germany

[21] Appl. No.: 632,168

[22] Filed: Dec. 21, 1990

[30] Foreign Application Priority Data

Dec. 23, 1989 [EP] European Pat. Off. ........ 89123896.6

[51] Int. Cl.⁵ .............................................. G01B 9/02
[52] U.S. Cl. ............................... 356/345; 250/227.27; 356/358; 385/14
[58] Field of Search ..................... 356/345, 358, 356; 256/227.19; 250/227.27; 350/96.14, 96.12, 96.15

[56] References Cited

U.S. PATENT DOCUMENTS

| | | | |
|---|---|---|---|
| 4,759,627 | 7/1988 | Thylen et al. | 356/345 |
| 4,938,596 | 7/1990 | Parriaux et al. | 356/356 |
| 4,957,362 | 9/1990 | Peterson | 350/96.14 |

FOREIGN PATENT DOCUMENTS

| | | |
|---|---|---|
| 2163549 | 2/1986 | United Kingdom . |
| 8500221 | 1/1985 | World Int. Prop. O. . |
| 8809917 | 12/1988 | World Int. Prop. O. . |

*Primary Examiner*—Samuel A. Turner
*Attorney, Agent, or Firm*—Willian Brinks Olds Hofer Gilson & Lione

[57] ABSTRACT

In an arrangement with at least one waveguide coupler, two photo beam bundles are supplied to both of the inputs of the waveguide coupler by two input grids and are brought to interference in the coupling area. A damping element is provided in the coupling area of the waveguide coupler for obtaining at the two outputs two signals having a mutual phase shift of other than 180° by two detectors.

13 Claims, 1 Drawing Sheet

APPARATUS AND METHOD HAVING AT LEAST ONE WAVEGUIDE COUPLER TO CREATE AT LEAST TWO SIGNALS HAVING A MUTUAL PHASE SHIFT NOT EQUAL TO 180 DEGREES

FIELD OF THE INVENTION

The present invention is generally directed to an apparatus and method having at least one waveguide coupler in which bundles of light beams supplied to the coupler's inputs are brought to interference and where detectors for the generation of signals which are phase shifted with respect to one another are provided at the coupler's outputs, and particularly, to a 2×2 coupler wherein the phase shift between the generated signals is other than 180°.

BACKGROUND OF THE INVENTION

Typically, an integrated optical circuit has at least one coupler from which there is obtained signals having a mutual phase shift. U.S. Pat. No. 4.938.595 issued Jul. 3, 1990 uses a 2×3 coupler which produces three output signals having a mutual phase shift of 120°. When a 2×4 coupler is used, four signals are produced having a mutual phase shift of 90°.

However, if a 2×2 coupler is used, as described in U.S. Pat. No. 4,759,627 issued Jul. 26, 1988, two signals are produced having a mutual phase shift of 180°.

For many applications, a photoelectric position measuring device requires the detection of measuring direction The prior art, however, has several disadvantages. If a 2×2 coupler is used, the measuring direction cannot be detected since the two output signals have a mutual phase shift of 180°. If a 2×3 or a 2×4 coupler is used, the measuring direction can be detected, however, couplers having more than two outputs have certain disadvantages associated therewith. First, the coupling properties are changed, for example, because of output fluctuations, and thus the degree of modulation and the phase relation between the signals at the output are affected. Second, relative changes of the amplitudes of the two signals at the two inputs of the waveguide coupler generate changes in the degree of modulation and the phase relation between the signals at the outputs.

Accordingly, it is a primary object of the present invention to provide an apparatus and method to generate in a simple manner at least two signals with a mutual phase shift other than 180° using at least one waveguide coupler.

Another object of the present invention is to provide a 2×2 coupler for use in position measuring apparatus and method which is able to determine the measuring direction by providing at least one damping element or phase shifting element in at least one 2×2 coupler to generate by simple means two signals at its outputs with a mutual phase shift other than 180°.

SUMMARY OF THE INVENTION

The present invention is directed to an apparatus and method having at least one waveguide coupler to create at least two signals having a mutual phase shift not equal to 180°. The waveguide coupler has a first input for coupling bundles of photo beams with said waveguide coupler and a second input for coupling bundles of photo beams with said waveguide coupler. The bundles of photo beams may be obtained, for example, from a diffraction grid. The waveguide coupler has means for interfering the bundles of photo beams supplied by the first and second inputs in an interference zone. In addition, means for detecting a first output and a second output are provided at the outputs of the waveguide coupler. The means for detecting the output signals also generate signals representative of the outputs. The inputs provided to the waveguide coupler by the first and second inputs are phase shifted thereby resulting in signals having a mutual phase shift not equal to 180°. The apparatus can then be used in a position measuring apparatus where the discrimination of the measuring direction is required.

The present invention has the advantage of being able to generate at least two signals having a mutual phase shift not equal to 180° using a 2×2 coupler.

In addition, by not using a coupler with more than two outputs, the coupling properties are not affected thus the phase relation between the signals is not affected.

Further objects and advantages will become apparent from the following description and the accompanying drawings.

BRIEF DESCRIPTION OF THE DRAWINGS

Further objects and advantages of the present invention will become apparent and readily appreciated from the following detailed description of the present invention, taken in conjunction with the accompanying drawings of which.

DETAILED DESCRIPTION OF THE PREFERRED EMBODIMENTS

The preferred embodiments of the present invention will hereinafter be described in detail with reference to the accompanying drawings.

Figure 1:
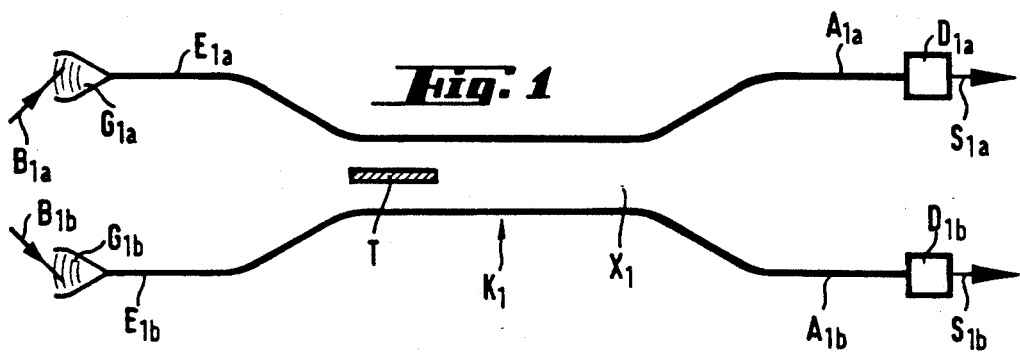
FIG. 1 illustrates an apparatus using a 2×2 coupler with two detectors and a damping element in accordance with a first preferred embodiment of the present invention.

FIG. 1 illustrates a first preferred embodiment of the present invention having a waveguide coupler in the form of an integrated optical 2×2 coupler $K_1$. The coupler $K_1$ has two inputs $E_{1a}$ and $E_{1b}$ and two outputs $A_{1a}$ and $A_{1b}$. A first photo beam bundle in the form of a first diffraction beam $B_{1a}$ is fed into the first input $E_{1a}$ via a first input grid $G_{1a}$. A second photo beam bundle in the form of a second diffraction beam $B_{1b}$ is fed into the second input $E_{1b}$ via a second input grid $G_{1b}$. The two diffraction beams $B_{1a}$ and $B_{1b}$ emanate, for example, from a diffraction grid of a position measuring apparatus for measuring the relative position of two objects (not shown), which is described, for example, in U.S. Pat. No. 4,938,595 issued Jul. 3, 1990 incorporated herein by reference. The input signals can also be provided by means of lenses or optical fibers and the coupler can also be a component of an IOC, for example a Mach-Zender interferometer.

The optical signals fed into the inputs $E_{1a}$ and $E_{1b}$ are brought to interference in the coupling area $X_1$ of the coupler $K_1$. In prior art devices, two signals having a mutual phase shift of 180° would be generated at the two outputs of an absorption-free coupler.

However, a generation of a mutual phase shift of 90° between the two signals, as opposed to a mutual phase shift of 180°, is desired for the discrimination of the measuring direction, for example. In order to obtain such a mutual phase shift, a damping element T is provided in accordance with the present invention in the coupling area $X_1$ of the coupler $K_1$. The damping element T causes a desired mutual phase shift of other than 180° between two signals $S_{1a}$ and $S_{1b}$ by means of loss induction. For example, the signals may have a mutual phase shift either greater than 0° but less than 180° or greater than 180° but less than 360°. This damping element T may consist, for example, of an etched surface, an absorbent layer, a photoelement or a decoupling element in the form of a decoupling grid. This damping principle can also be employed in connection with waveguide couplers with more than two outputs.

Two detectors $D_{1a}$ and $D_{2a}$ are provided at outputs $A_{1a}$ and $A_{2a}$ of the coupler $K_1$. The detectors $D_{1a}$ and $D_{2a}$ detect the output of the coupler and generate signals $S_{1a}$ and $S_{2a}$ representative thereof.

Figure 2:
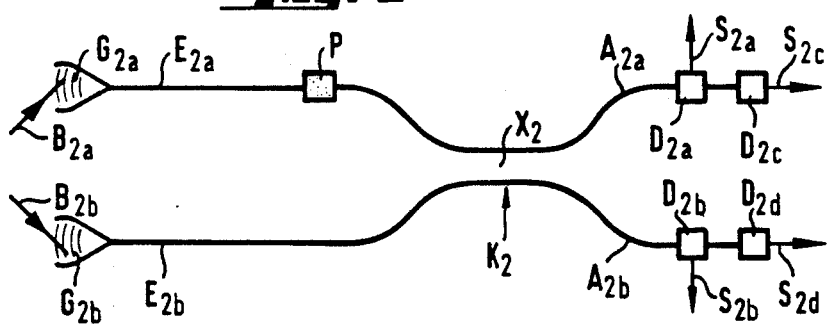
FIG. 2 illustrates an apparatus using a 2×2 coupler with four detectors and a phase shifting element in accordance with a second preferred embodiment of the present invention.

FIG. 2 illustrates a second preferred embodiment of the present invention having a waveguide coupler in the form of an integrated optical 2×2 coupler $K_2$. The coupler $K_2$ has two inputs $E_{2a}$ and $E_{2b}$ and two outputs $A_{2a}$ and $A_{2b}$. A first photo beam bundle in the form of a first diffraction beam $B_{2a}$ is fed in two orthogonal polarization states, i.e. in a TE mode and a TM mode, to the first input $E_{2a}$ via a first input grid $G_{2a}$. A second photo beam bundle in the form of a second diffraction beam $B_{2b}$ is also fed in two orthogonal polarization states, i.e. in a TE mode and a TM mode, to the second input $E_{2b}$ via a second input grid $G_{2b}$.

A phase shifting element P, which shifts the phases of the TE mode and the TM mode by a mutual phase angle, preferably 90°, is provided between the first input $E_{2a}$ and the coupling area $X_2$ of the coupler $K_2$. The signals fed to the inputs $E_{2a}$ and $E_{2b}$ are brought to interference in their two polarization states in the coupling area $X_2$. At the first output $A_{2a}$ a first signal $S_{2a}$ is generated from the TE mode by means of a first polarization-sensitive detector $D_{2a}$ and a third signal $S_{2c}$ is generated from the TM mode by means of a third polarization-sensitive detector $D_{2c}$. A mutual phase shift exists between the first signal $S_{2a}$ and the third signal $S_{2c}$.

At the second output $A_{2b}$, a second signal $S_{2b}$ is generated from the TE mode by means of a second polarization-sensitive detector $D_{2b}$ and a fourth signal $S_{2d}$ is generated from the TM mode by means of a fourth polarization-sensitive detector $D_{2d}$ in the same way. A mutual phase shift also exists between the second signal $S_{2b}$ and the fourth signal $S_{2d}$. Between each one of the first signal $S_{2a}$ and the second signal $S_{2b}$ as well as between the third signal $s_{2c}$ and the fourth signal $S_{2d}$ there is a mutual phase shift of 180°. The four signals $S_{2a}$ to $S_{2d}$ therefore have a mutual phase shift of 90°; the phase positions of $S_{2a}=0°$, $S_{2c}=90°$, $S_{2b}=180°$ and $S_{2d}=270°$. With a mutual phase shift of 90° between the signals, the discrimination of the measuring direction is made possible.

This second preferred embodiment has the advantage that changes in the coupling properties of the coupler $K_2$ or changes in the amplitude of the input signals only change the degree of modulation, but not the mutual phase position between the four signals $S_{2a}$ to $S_{2d}$ at the two outputs $A_{2a}$ and $A_{2b}$.

Figure 3:
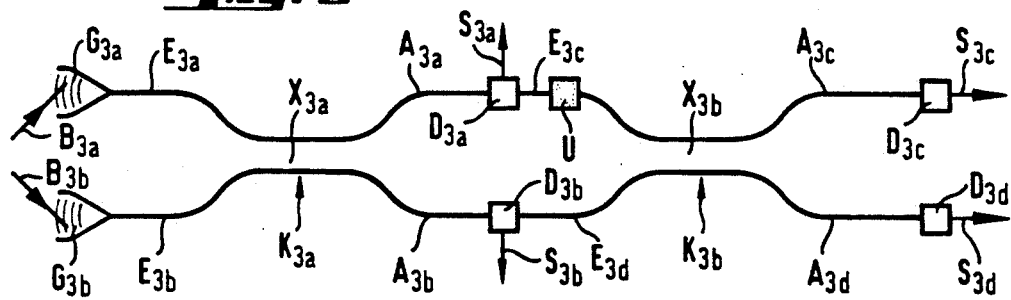
FIG. 3 illustrates an apparatus using two serially arranged 2×2 couplers with four detectors and a phase shifting element in accordance with a third preferred embodiment of the present invention.

FIG. 3 illustrates a third preferred embodiment of the present invention having two serially connected waveguide couplers in the form of two 2×2 couplers $K_{3a}$ and $K_{3b}$. Coupler $K_{3a}$ has two inputs $E_{3a}$ and $E_{3b}$ and two outputs $A_{3a}$ and $A_{3b}$. Coupler $K_{3b}$ has two inputs $E_{3c}$ and $E_{3d}$ as well as two outputs $A_{3c}$ and $A_{3d}$. A first photo beam bundle in the form of a first diffraction beam $B_{3a}$ is fed into the first input $E_{3a}$ via a first input grid $G_{3a}$. A second photo beam bundle in the form of a second diffraction beam $B_{3b}$ is fed into the second input $E_{3b}$ via a second input grid $G_{3b}$.

In the coupling area $X_{3a}$ of the first coupler $K_{3a}$ the optical signals fed from the inputs $E_{3a}$ and $E_{3b}$ are brought to interference. A portion of the light is decoupled at the output $A_{3a}$ of the first coupler $K_{3a}$ and is supplied to a first detector $D_{3a}$ for the generation of a first signal $S_{3a}$ and a portion of the light is decoupled at output $A_{3b}$ of the first coupler $K_{3a}$ and is supplied to a second detector $D_{3b}$ for the generation of a second signal $S_{3b}$. The signals $S_{3a}$ and $S_{3b}$ have a mutual phase shift of 180°. The two detectors $D_{3a}$ and $D_{3b}$ are mounted directly on the wave guides at the outputs $A_{3a}$ and $A_{3b}$ of the first coupler $K_{3a}$ for the purpose of this partial decoupling. However, this partial decoupling can also be achieved by means of decoupling grids (not shown). In addition, FIG. 4 illustrates decoupling using two additional couplers $K_{3c}$ and $K_{3d}$ which will be further explained with reference to FIG. 4.

A phase shifting element U is provided between the first input $E_{3c}$ of the second coupler $K_{3b}$ and its coupling area $X_{3b}$, which causes a mutual phase shift between the two remaining optical signals entering the two inputs $E_{3c}$, $E_{3d}$ of the second coupler $K_{3b}$. The two remaining optical signals are then brought to interference in the coupling area $X_{3b}$ of the second coupler $K_{3b}$ so that a third signal $S_{3c}$ is generated by means of a third detector $D_{3c}$ at the first output $A_{3c}$ of the second coupler $K_{3c}$ and a fourth signal $S_{3d}$ by means of a fourth detector $D_{3d}$ at the second output $A_{3d}$ of the second coupler $K_{3c}$. Signals $S_{3c}$ and $S_{3d}$ have a mutual phase shift of 180°. Thus the phase shifting element U causes a mutual phase shift between each one of the first signal $S_{3a}$ and the third signal $S_{3c}$ as well as between the second signal $S_{3b}$ and the fourth signal $S_{3d}$. With a phase shift equal to 90°, the four signals $S_{3a}$ to $S_{3d}$ therefore have the phase positions of $S_{3a}=0°$, $S_{3c}=90°$, $S_{3b}=180°$, $S_{3d}=270°$ thus making the discrimination of the measuring direction is possible. Furthermore, the phase shift can also be achieved by means of a difference in length or a different geometric shape of the two wave guides at the two inputs $E_{3c}$ and $E_{3d}$ of the second coupler $K_{3b}$.

Figure 4:
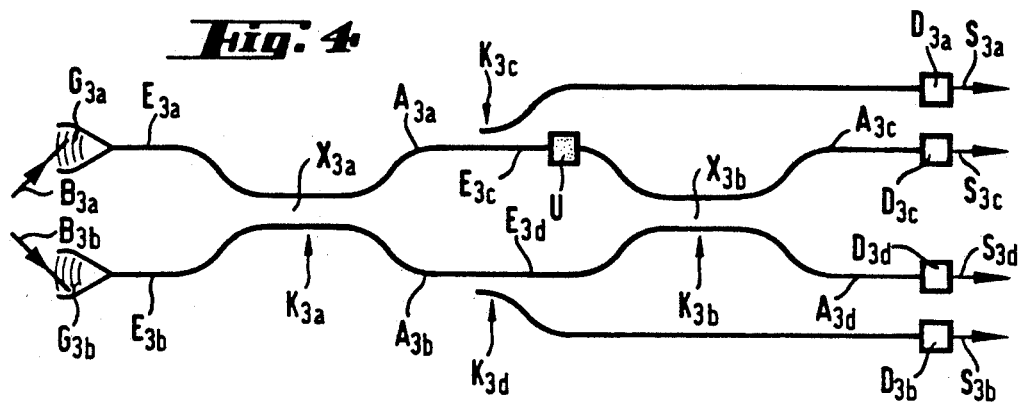
FIG. 4 illustrates an apparatus using four couplers in accordance with a fourth embodiment of the present invention.

FIG. 4 illustrates a fourth preferred embodiment of the present invention. Two serially connected waveguide couplers in the form of two 2×2 couplers $K_{3a}$ and $K_{3b}$ as shown in FIG. 3 are used. The same reference numerals will be used in FIG. 4 for the same elements as shown in FIG. 3. The partial decoupling of the two diffraction beams $B_{3a}$ and $B_{3b}$ at the two outputs $A_{3a}$ and $A_{3b}$ of the first coupler $K_{3a}$ is achieved by means of two additional couplers $K_{3c}$ and $K_{3d}$. Couplers $K_{3c}$ and $K_{3d}$ are connected with detectors $D_{3a}$ and $D_{3b}$.

It is to be understood that additional couplers may be serially connected to generate additional phase shifted signals.

While this invention has been shown and described in connection with preferred embodiments, it is apparent that certain changes and modifications, in addition to those mentioned above, may be made from the basic features of the present invention. Accordingly, it is intended that the scope of the invention be defined by the following claims, including all equivalents.

What is claimed is:

1. An arrangement comprising one waveguide coupler in which bundles of photo beams supplied to inputs of said waveguide coupler are brought to interference and where detectors for the generation of signals which are phase-shifted with respect to one another are provided at outputs of said waveguide coupler, wherein at least one damping element is provided in a coupling area of said waveguide coupler to generate at the outputs of said waveguide coupler at least two signals having a mutual phase shift of other than 180°.

2. An arrangement according to claim 1 wherein said waveguide coupler consists of a 2×2 coupler with two inputs and two outputs.

3. An arrangement according to claim 1 wherein said damping element consists of an absorbent layer, a photo element of an outcoupling.

4. An arrangement according to claim 1 wherein input grids for the photo beam bundles are provided at the inputs of said wave guide coupler.

5. An arrangement according to claim 1 wherein said damping element reduces the intensity of said beams.

6. An arrangement comprising one waveguide coupler in which bundles of photo beams supplied to inputs of said waveguide coupler are brought to interference and where detectors for the generation of signals which are phase-shifted with respect to one another are provided at outputs of said waveguide coupler, wherein for the generation of at least two signals with a mutual phase shift of other than 180°, the photo beam bundles supplied to the inputs are fed in orthogonally polarized TE/TM modes, in that in at least one input an element is provided which phase-shifts the phases of the TE/TM modes of the photo beam bundles differently, and in that a detector each is provided at the outputs for each mode.

7. An arrangement according to claim 6 wherein said waveguide coupler consists of a 2×2 coupler with two inputs and two outputs.

8. An arrangement according to claim 6 wherein input grids for the photo beam bundles are provided at the inputs of said wave guide coupler.

9. An arrangement comprising a first waveguide coupler in which bundles of photo beams supplied to inputs of said first coupler are brought to interference, a second waveguide coupler having inputs serially connected to outputs of said first coupler, first detectors for the generation of first signals are provided at the outputs of said first coupler, a phase-shifting element in at least one input of said second coupler and second detectors for the generation of second signals are provided at the outputs of said second coupler wherein said first signals have a phase shift other than 180° from said second signals.

10. An arrangement according to claim 9 wherein said first waveguide coupler consists of a 2×2 coupler with two inputs and two outputs.

11. An arrangement according to claim 9, wherein said damping element is disposed in the coupling area of a waveguide coupler.

12. An arrangement according to claim 9 wherein input grids for the photo beam bundles are provided at the inputs of said first wave guide coupler.

13. An arrangement according to claim 9 wherein additional couplers are disposed at the outputs of said first waveguide coupler, which are connected with said first detectors.

* * * * *

UNITED STATES PATENT AND TRADEMARK OFFICE
CERTIFICATE OF CORRECTION

PATENT NO. : 5,162,869

DATED : November 10, 1992

INVENTOR(S) : DIETER MICHEL et al.

It is certified that error appears in the above-identified patent and that said Letters Patent is hereby corrected as shown below:

<u>ON THE TITLE PAGE</u>

Under the heading "U.S. PATENT DOCUMENTS", in the second line, delete "4,938,596" and substitute therefor --4,938,595--.

Column 1, line 21, delete "4.938.595" and substitute --4,938,595--.

Column 1, line 21, delete "Jul." and substitute --July--.

Column 1, line 27, delete "Jul." and substitute --July--.

Column 1, lines 30-31, after "direction" insert --.--.

Column 2, line 66, delete "Jul." and substitute --July--.

UNITED STATES PATENT AND TRADEMARK OFFICE
CERTIFICATE OF CORRECTION

PATENT NO. : 5,162,869
DATED : November 10, 1992
INVENTOR(S) : DIETER MICHEL et al.

It is certified that error appears in the above-indentified patent and that said Letters Patent is hereby corrected as shown below:

Column 5, claim 3, line 3, delete "of" and substitute ---or--- and after "outcoupling" please insert ---element---.

Signed and Sealed this

Thirteenth Day of September, 1994

Attest:

BRUCE LEHMAN

Attesting Officer  Commissioner of Patents and Trademarks